(12) United States Patent
Norton

(10) Patent No.: US 6,232,679 B1
(45) Date of Patent: May 15, 2001

(54) ELECTRICITY GENERATOR AND HEAT SOURCE FOR VEHICLES

(76) Inventor: Peter Norton, P. O. Box 62, Northville, MI (US) 48167

(*) Notice: Subject to any disclaimer, the term of this patent is extended or adjusted under 35 U.S.C. 154(b) by 0 days.

(21) Appl. No.: 09/412,253

(22) Filed: Oct. 5, 1999

(51) Int. Cl.[7] .............................. G21D 7/02; B60L 1/02; F01D 15/10; F01K 1/00; H02P 9/04
(52) U.S. Cl. ............................ 310/11; 290/2; 290/52; 60/659; 322/14; 237/12.1
(58) Field of Search ....................... 310/52–59, 11, 310/119; 290/2, 4 D, 1 A, 52; 60/643, 659, 337, 668, 421; 322/14; 237/12.1, 12.3 R, 12.4, 13

(56) References Cited

U.S. PATENT DOCUMENTS

| | | | |
|---|---|---|---|
| 3,726,085 | * 4/1973 | Arenson | 60/36 |
| 3,913,331 | * 10/1975 | Conwell | 60/692 |
| 4,068,475 | * 1/1978 | Binstock | 60/646 |
| 4,262,485 | * 4/1981 | Kuroda et al. | 60/669 |
| 4,873,840 | * 10/1989 | Gilliusson | 62/238.6 |
| 4,875,436 | * 10/1989 | Smith et al. | 122/7 R |
| 5,000,003 | * 3/1991 | Wicks | 60/618 |
| 5,172,753 | * 12/1992 | Kadle et al. | 165/42 |

* cited by examiner

*Primary Examiner*—Nestor Ramirez
*Assistant Examiner*—Dang Dinh Le

(57) ABSTRACT

A combined heat and electricity generating unit is suitable for use in class 8 trucks and the like. When it is operating it provides heat for keeping the engine and cabin warm and electricity for use by the electricity consuming devices in the cabin. It is a closed cycle system that includes a radial inlet turbine driven by a low pressure vaporized and superheated working fluid, an oil fired heater for vaporizing the working fluid, a pump for pumping condensed working fluid, a heat exchanger for heating engine coolant with heat from the condensing working fluid and an electric generator for converting energy produced by the turbine to electricity.

10 Claims, 1 Drawing Sheet

ELECTRICITY GENERATOR AND HEAT SOURCE FOR VEHICLES

FIELD OF THE INVENTION

This invention relates to combined heat and electricity generating plants for providing both heat for keeping a vehicle warm and electricity for powering such as domestic appliances.

BACKGROUND OF THE INVENTION

Steam turbines are well known. Steam turbines may have closed and sealed containment of the working fluid wherein the working fluid may be water or another fluid. It is also well known to use heat rejected by the steam turbine as a source of heat.

Large trucks perform a large and increasing fraction of the transportation of goods. Many of these trucks have cabins containing appliances requiring substantial amounts of electricity. These include air conditioners, ovens, lamps, electric blankets, etc. Virtually any small appliance sold for use in a home may be found in the cabin of a truck. It is common for the engines of these trucks to be operated constantly while the trucks are parked overnight to generate electricity for these appliances and, when the outside temperature is low, to keep the engine warm. Operating the engine overnight is both wasteful of fuel and a cause of engine wear. An electricity generator independent of the engine is desired to provide the required electricity and also provide heat for warming the engine and the cabin. However, no known electricity generator has achieved market acceptance.

A gas turbine powered electricity generator is known. It offers the desirable qualities of operation on diesel fuel, long life, quiet operation and low pollution and it provides waste heat for heating the engine and the cabin. It has the disadvantages of high cost and high fuel consumption.

Diesel powered generator sets are available at an acceptable price and size. However, they are noisy, generate odorous and unclean exhaust and they are complex devices that require maintenance and are not inexpensive to service.

Rankine cycles for power generation have been known for many years. For many years most electricity has been generated by steam turbines using steam from coal or oil fired boilers or from atomic reactors. It is also well known to use steam turbines for bottoming cycles for large diesel engines to convert waste heat to electricity. In small sizes such as one to five kilowatts steam turbines do not convert the energy in the steam efficiently to power. One reason for poor efficiency in small sizes is that very small turbine entry areas do not provide optimum flow conditions.

Heretofore it has not been recognized that a low pressure closed Rankine cycle turbine is superior to other known ways of providing heat and electricity to the cabin of a truck. Higher efficiency can be achieved by using a working fluid offering lower vapor pressure and lower speed of sound than water vapor. All of the desired features are obtained including operation on diesel fuel, low noise, acceptable exhaust constituents, simplicity, freedom from maintenance and acceptable efficiency.

SUMMARY OF THE INVENTION

The present invention provides a cogeneration plant comprising a Rankine cycle turbine prime mover in combination with an electric generator that is superior to other known systems for heating and providing electricity to truck cabins.

Further, in accordance with this invention, the turbine is provided in a closed cycle system operating at low pressure.

Further, in accordance with this invention, the closed cycle system utilizes a working fluid having a low speed of sound for enabling lower turbine speeds and larger nozzle areas.

A complete understanding of this invention may be obtained from the description that follows taken with the accompanying drawings.

BEST MODE FOR CARRYING OUT THE INVENTION

Figure 1:
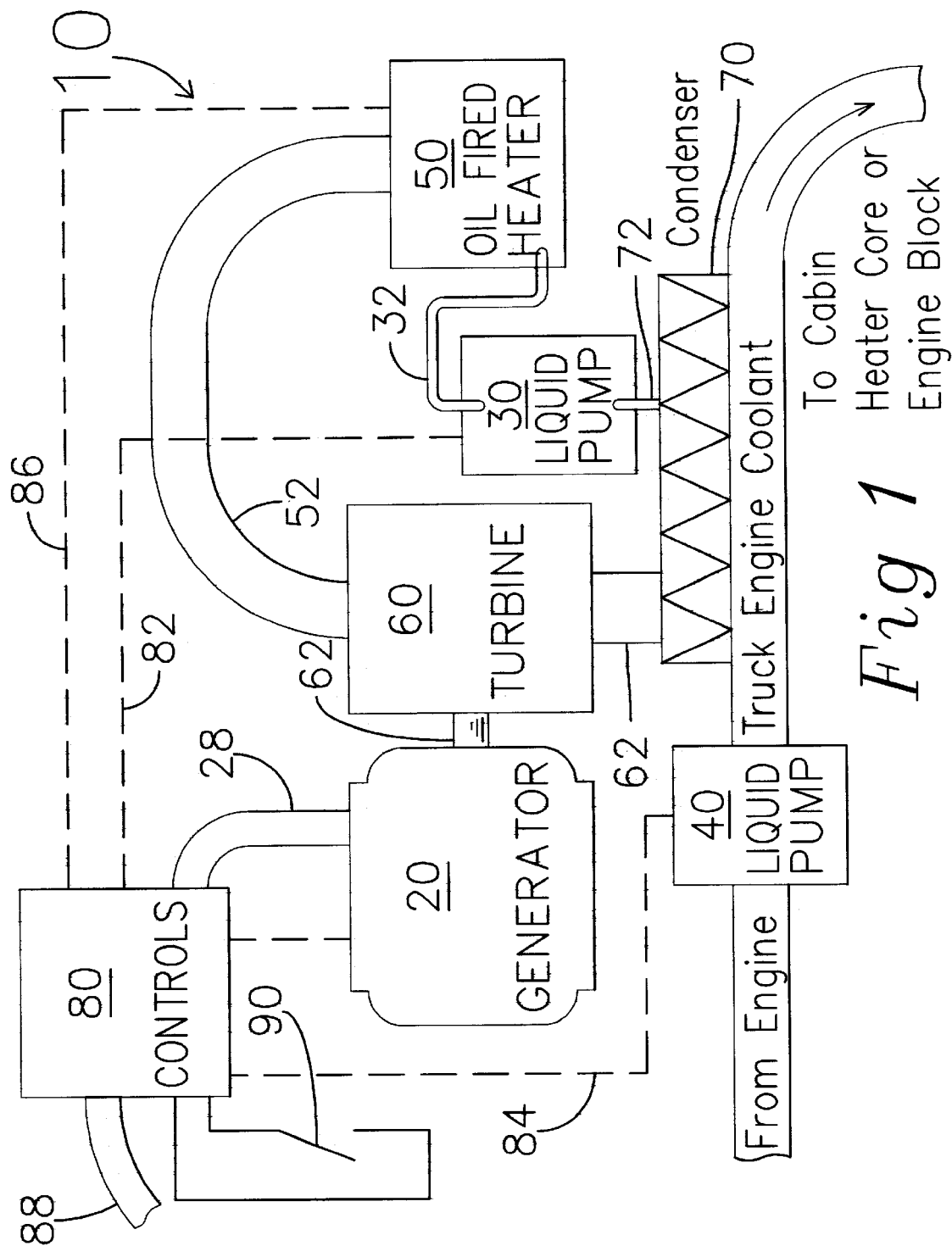
FIG. 1 shows a schematic diagram of the electricity generating and heat producing plant of the invention.

Referring now to the Figure, an illustrative embodiment of the invention is shown in a heating and electricity generating system 10. The heating and electricity generating system 10 comprises a generator 20 for generating electricity, a pump 30 for pressurizing liquified working fluid, a pump 40 for circulating engine coolant, an oil fired heater 50, a turbine 60 for driving generator 20 through shaft 62 and a condenser 70 for liquefying the working fluid. A control 80 receives power from generator 20 through conductor 28 and supplies power to power consumers through conductor 88. Control 80 also controls pump 30, pump 40 and oil fired heater 50 through means indicated by dashed lines 82, 84 and 86 respectively.

It will be appreciated as the description proceeds that the invention may be implemented in different embodiments.

Referring now to FIG. 1, the heating and electricity generating system 10 comprises a generator 20 which can be any of many known designs. The preferred generator design is a high speed generator with a permanently magnetized armature and electronic commutation of the stator coils. This design is known to have the advantages of small size and high efficiency.

The pump 30 may be of any known design but is preferably a piston or gerotor type pump powered by an electric motor. The pump 40 is preferably a centrifugal pump powered by an electric motor designed to provide a flow of several gallons per minute of engine coolant.

The oil fired heater 50 may be of any conventional design. A preferred design uses an oil burner of the catalytic type commonly used in room heaters. Means such as fire tubes are provide to transfer heat from the combustion gases produced by the oil burner of heater 50 to the liquified working fluid.

The turbine 60 is preferably a radial inlet centrifugal turbine but may be of any known design suitable for converting pressurized working fluid provided by oil fired heater 50 to mechanical energy. Computer codes are available from many sources for computing the exact shape of a suitable turbine rotor and housing depending on the working fluid, operating temperatures and power rating. The turbine rotor is preferably made by an inexpensive process such as casting and is preferably made of an inexpensive metal such as a steel.

Condenser 70 receives spent working fluid from turbine 60 and cools it to liquify it and transfers the heat it receives to engine coolant provided by pump 40. Condenser 70 may be of any design known to be suitable by those skilled in the design of heat exchangers.

Control 80 operates to control power to the coils in generator 20 if required which would be required if generator 20 is of the type having a rotor comprising permanent magnets. Control 80 also operates to convert the power it receives from generator 20 to a desired form such as 120 volt 60 Hertz ac or 12 volt dc and deliver that power through electrical conductors 88. Control 80 also receives from a switch 90 located in the vehicle cabin a signal turning the heating and electricity generating system 10 on or off. Control 80 also indicates to pumps 30 and 40 and oil fired heater 50 by means indicated by dashed lines 82, 84 and 86 respectively that they should turn on or off.

Heating and electricity generating system 10 is a sealed system filled with a working fluid. The working fluid is selected to have the desirable properties of low sound velocity in the vapor, high heat of vaporization, a suitable condensation temperature at the operating pressures, a high critical temperature, a low freezing temperature, a low viscosity and a high film heat conductivity. An optimum working fluid has not been identified but decane and is believed to be suitable. A primary consideration is that the low temperature of the cycle is likely to be the temperature of a hot engine and the working fluid must have a low vapor pressure at these high temperatures so it can be condensed in condenser 70.

The operation of the heating and electricity generating system 10 of this invention will now be described with reference to FIG. 1. In operation of the system, when the truck operator closes switch 90, control 80 initiates operation of the heating and electricity generating system 10 by providing power or otherwise controlling pump 30, pump 40, and oil fired heater 50 to begin operating. Pump 30 pumps any liquid working fluid in condenser 70 through fluid conduit 32 into oil fired heater 50. Pump 40 circulates engine coolant through condenser 70 for withdrawing heat from the working fluid and causing it to condense to a liquid. Oil fired heater 50 burns diesel fuel from the main fuel supply of the truck to heat and vaporize and thereby pressurize the working fluid. Preferably, the working fluid vapor is then superheated by oil fired heater 50. The superheated working fluid vapor is conducted by conduit 52 to the inlet of turbine 60 where it causes turbine 60 to turn shaft 62 and the armature of electric generator 20. The spent working fluid vapor (with any entrained liquid) is conducted by fluid conductor 62 to condenser 70 where the spent working fluid condenses to a liquid and the heat it contains is transferred to the engine coolant. Heat in the coolant is carried to the heater core in the passenger compartment in cold weather to heat the passenger compartment and in warm weather it is sent directly to the engine block which operates as a large heat sink. Generator 20 generates electrica power which is supplied through conductor 28, control 80 and conductor 88 for use by the electrical appliances in the truck cabin.

An advantage the heating and electricity generating system 10 is that it is acoustically quiet because all of the components when combined as described hereinabove are not noisy. More particularly, the pump 30 is quiet by virtue of its small size. Pump 40 is also quiet by virtue of being a centrifugal pump of small size and low pressure. Oil fired heaters of the catalytic type are commercially available in designs that are acoustically quiet. Turbine 60 is also inherently quiet. Therefore the cogeneration system described hereinabove can be installed in such as the engine compartment of a truck or elsewhere outside the truck cabin and will not generate objectionable sound even when the truck is parked and the operator is sleeping. By comparison, other low cost cogeneration plants are undesirably noisy without sound insulation means. A particular example of a cogeneration plant that is undesirably noisy comprises a Diesel engine driving an electric generator.

A second advantage of the heating and electricity generating system 10 is that it minimizes pollution. Catalytic heaters produce sufficiently low amounts of objectionable gases that they are commonly sold for use inside residences.

A third advantage of the heating and electricity generating system 10 is that all components are likely to last for the lifetime of the truck without maintenance. Gerotor pumps are used as oil pumps in engines and last the lifetime of the engine. Centrifugal pumps can be designed to last far longer than required. Oil fired heaters are simple and reliable. Turbines on fluid bearings have no wear except at the bearings which can be designed to provide the desired lifetime.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A cogeneration system for providing heat and electric power to a vehicle such as a truck having an engine cooled by a liquid engine coolant when said engine is not operating comprising:

a working fluid a turbine having a turbine inlet and a turbine outlet, an electric generator coupled with said turbine for being driven thereby, a fuel burning heater for vaporizing said working fluid for supplying vapor to said turbine inlet, a condenser for receiving spent said working fluid vapor from said turbine outlet and condensing it to be liquid working fluid, a first pump for pumping said liquid working fluid from said condenser to said heater be heated and vaporized, a second pump for pumping said engine coolant through said condenser for heating said coolant with heat from said spent working fluid vapor, and a control means for controlling said fuel burning heater, said first pump and said second pump to operate at certain times.

2. The invention as define d by claim 1 wherein:
   said heater comprises a catalytic combustor.
3. The invention as defined by claim 1 wherein:
   said means for driving said first pump is an electric motor.
4. The invention as defined by claim 1 wherein:
   said first pump is a gerotor pump.
5. The invention as defined by claim 1 wherein:
   said means for driving said second pump is an electric motor.
6. The invention as defined by claim 1 wherein:
   said second pump is a centrifugal pump.
7. The invention as defined by claim 1 wherein:
   said working fluid when vaporized and entering said turbine inlet is pressurized to a pressure below atmospheric pressure.
8. The invention as defined by claim 1 wherein:
   said working fluid is decane.
9. The invention as defined by claim 1 wherein:
   said working fluid is aniline.
10. The invention as defined by claim 1 wherein:
    said generator is a permanent magnet generator, and said control means also controls said generator.

* * * * *